United States Patent [19]
Shimizume

[11] Patent Number: 5,910,934
[45] Date of Patent: Jun. 8, 1999

[54] DISC REPRODUCING APPARATUS AND METHOD WITH ADJUSTMENT OF ROTATION SPEED BETWEEN READ POSITIONS

[75] Inventor: Kazutoshi Shimizume, Kanagawa, Japan

[73] Assignee: Sony Corporation, Japan

[21] Appl. No.: 08/787,798

[22] Filed: Jan. 23, 1997

[30] Foreign Application Priority Data

Jan. 24, 1996 [JP] Japan .................................. 8-010449

[51] Int. Cl.⁶ ........................................................ G11B 7/00
[52] U.S. Cl. ................................................. 369/50; 369/54
[58] Field of Search .................................. 369/32, 47, 50, 369/54, 58, 111

[56] References Cited

U.S. PATENT DOCUMENTS

| | | | |
|---|---|---|---|
| 4,530,083 | 7/1985 | Ishihara | 369/267 |
| 5,243,587 | 9/1993 | Itoh et al. | 369/50 X |
| 5,343,453 | 8/1994 | Ogino | 369/50 X |
| 5,583,841 | 12/1996 | Ceshkovsky | 369/50 X |

FOREIGN PATENT DOCUMENTS 0 123 946  11/1984  European Pat. Off. .

OTHER PUBLICATIONS

Patent Abstracts of Japan, vol. 14, No. 195, P1039, & JP 2-37565, Apr. 20, 1990.
Patent Abstracts of Japan, vol. 95, No. 9, Oct. 31, 1995, for JP 7-161130.
Patent Abstracts of Japan, vol. 96, No. 7, Jul. 31, 1996, for JP 8-63867.

*Primary Examiner*—W. R. Young
*Attorney, Agent, or Firm*—Rader, Fishman & Grauer; Ronald P. Kananen

[57] ABSTRACT

A disc reproducing apparatus such as a disc player and a method of the same which of the seek time can be shortened at the time of traverse of a pick-up, by calculating a line speed at a read position of a disc before the change of the read position and the target line speed after the change of the read position before the pick-up is traversed, controlling the rotational speed of a rotation driving unit to that before the change of the read position so that the line speed at the read position after the change falls within a maximum reproduction line speed.

7 Claims, 7 Drawing Sheets

DISC REPRODUCING APPARATUS AND METHOD WITH ADJUSTMENT OF ROTATION SPEED BETWEEN READ POSITIONS

BACKGROUND OF THE INVENTION

1. Field of the Invention

The present invention relates to a disc reproducing apparatus, such as a disc player, and a method of operating the same, and more particularly relates to a disc reproducing apparatus preferred for use in reproduction of a CD-ROM utilized as a storage medium for storing data and programs.

2. Description of the Related Art

In a conventional CD-ROM player, the rotation speed of a CD-ROM disc has been controlled at a target rotational speed of the spindle servo control system set to a frequency of 7.35 kHz of the frame synchronization signal or a whole multiple of the same.

Further, it becomes possible to read the data from the disc after the traverse only after the spindle rotational speed approaches the target value and enters into the capture range of the PLL (Phase Locked Loop) circuit. Therefore, a certain degree of time is necessary from the time when an optical pick-up (hereinafter simply referred to as a pick-up) reaches the read position of the next data to the time when it becomes possible to read the data. Thus, the seek time is considerably and undesirable prolonged.

More specifically, the line speed Va at a first position A becomes Ra/Rb times the line speed Vb at a second position B, where the radius at the position A and the line speed before the traverse of the pick-up are Ra and Va, respectively and the radius at the position B and the line speed after the traverse of the pick-up are Rb and Vb, respectively. On the other hand, the ratio of radius of the position A and position B reaches a maximum in a case where the position A is on the innermost circumference and the position B is on the outermost circumference. This ratio is about 2.52 for a standard sized disc. For example, in a case where an 8 times speed reproduction (which is 8 times the speed of a normal reproduction) is carried out at the innermost circumference, the pick-up is traversed to the outermost circumference for the reproduction, and the reproduction speed corresponds to 20.16 times speed at the instant of movement. Namely, there is generally a margin of safety in the reproduction speed of several tens of percent. The above reproduction speed largely exceeds the permissible range; therefore no data can be read until the line speed of the pick-up after the traverse to the outermost circumference is lowered to the maximum reproduction line speed, which leads to a considerable elongation of the seek time.

SUMMARY OF THE INVENTION

An object of the present invention is to provide a disc reproducing apparatus and a method of the same which the seek time can be greatly shortened.

According to the present invention, there is provided a disc reproducing apparatus comprising: a rotation driving means for rotating a disc; a reading means for reproducing recorded information of the disc; rotation servo means for detecting a speed difference between a rotational speed of the disc detected from the read signal of the reading means and a target rotational speed, generating a clock signal having a frequency in responsive to the speed difference, detecting a phase difference between the generated clock and a reference clock, and outputting a command signal in response to the phase difference to the rotation driving means to control the rotational speed of the disc; a line speed detecting means for detecting a line speed at a read position of the disc based on the read signal of the reading means; and a control means for controlling the rotational speed of the disc before the change of the read position so that the line speed at the read position after the change of the read position falls within a maximum reproduction line speed, based on the line speed obtained at the line speed detecting means upon receiving the change of the read position on the disc of the reading means.

Preferably, the rotation servo means has a first frequency dividing means for dividing the frequency of the clock signal, which has a frequency response to the speed difference between the rotational speed of the disc detected from the read signal of the reading means and the target rotational speed by a variable frequency division ratio, a second frequency dividing means for dividing the frequency of the reference clock by the variable frequency division ratio, and a phase comparing means for detecting the phase difference of the frequency-divided outputs of the first and second frequency dividing means; and the control means performs the control of the rotational speed of the disc by changing the frequency division ratio of the first and second frequency dividing means in response to the line speed obtained from the line speed detecting means.

Preferably, the reading means includes an optical pick-up which is freely movable in the radial direction; and the rotation servo means has a modulation circuit for modulating the read signal of the optical pick-up, outputting the modulated signal, a demodulation circuit for demodulating the modulated signal, outputting the demodulated signal, a servo signal processing circuit for detecting a speed difference between a rotational speed of the disc detected from the reproduction frame synchronization signal of the demodulation signal and a target rotational speed, outputting the servo error signal in response to the speed difference, a clock generating circuit for generating a clock having a frequency in response to the servo error signal from the servo signal processing circuit, a first frequency dividing circuit for dividing the frequency of the clock which is outputted from the clock generating circuit, a second frequency dividing circuit for dividing the frequency of a reference clock, and a phase comparing circuit for detecting the phase difference of the frequency-divided outputs of the first and second frequency dividing circuits.

Preferably, the modulation circuit performs the eight to fourteen modulation.

Preferably, the line speed detecting means counts the number of clocks, which have a frequency responsive in response to the speed difference between the rotational speed of the disc detected from the read signal of the reading means and the target rotational speed, for a predetermined period; and the line speed is detected from the counted number of clocks.

Preferably, the line speed detecting means includes: a counter circuit for counting the number of clocks having a frequency in response to the speed difference between the rotational speed of the disc detected from the read signal of the reading means and the target rotational speed for a predetermined period, a load circuit for reading out the number of clocks of the counter circuit, loading the number of clocks, an output circuit for reading out the number of clocks of the load circuit, converting the number of clocks to a serial data, and outputting the data to the control means.

Preferably, the control means receives the line speed before the change of read position, calculates a radius position and rotational speed at the position from the read signal of the reading means, determines a target line speed at the target position, the target line speed being defined within a range of the maximum reproduction line speed based on the radius position of the target position, finds the target rotational speed of the disc after the change of the read position from the target line speed and the radius of the target position, and controls the rotation driving means so that the rotational speed of the disc is lowered to the target rotational speed before the change of position is ended upon receiving the change of the read position on the disc of the reading means.

Preferably, the control means estimates the total amount of the reduction of the rotational speed which can be performed during changing the read position, calculates the amount of the reduction of the rotational speed which required before starting the change of the reading position, and controls the rotation means in response to the total amount of the reduction and the amount of the reduction before starting the change of the read position and during changing the read position.

According to the present invention a disc reproducing apparatus comprising: a rotation driving means for rotating a disc; a plurality of reading means for reproducing recorded information of the disc; a plurality of rotation servo means for detecting a speed difference between a rotational speed of the disc detected from the read signal of the reading means and a target rotational speed, generating a clock having a frequency in response to the speed difference, detecting the phase difference between the clock and a reference clock, and giving a command signal in response to the phase difference to the rotation driving means to control the rotational speed of the rotation driving means; a switching means for switching the plurality of reading means; a selecting and supplying means for selecting one signal among the output signals of the plurality of rotation servo means corresponding and supplying the selected reading means to the rotation driving means; a line speed detecting means for detecting the line speed at the read position of the disc based on the read signal of the plurality of reading means; and a control means for controlling the rotational speed of the rotation driving means to rotational speed before the change of the read position so that the line speed at the read position of the other reading means falls within a maximum reproduction line speed based on the line speed obtained from the line speed detecting means corresponding to the one reading means when switching from one reading means to another reading means and changing the read position on the disc.

Preferably the reading means includes the first and second reading means; and the control means finds the radius of the read position one of the two reading means, which is reproducing the data of a disc based on the read signal, determines the target line speed at the read position of the other of the two reading means, the target line speed being defined within the range of the maximum reproduction line speed, converts the target line speed into the line speed at the read position of the one reading means, and switches the reproducing read means from the one to the other after controlling the rotational speed of the disc so as to rotate at the converted line speed.

According to the present invention, there is provided a method of reproducing data from a disc, comprising the steps of: counting a line speed at a read position of the disc before the change of a read position; determining a target line speed after the change of a read position; controlling the rotational speed of the disc to the speed before the change of the read position so that the line speed at the read position after the change falls within a maximum reproduction line speed; and changing the read position.

In the disc reproducing apparatus and the method according to the present invention, the line speed of the disc at the read position is obtained from the read signal of the reading means during reproduction by the line speed detecting means.

Here, where the reading means moves or where there are a plurality of reading means and the read position is changed by switching, it is decided whether or not the line speed at the read position after the change exceeds the maximum reproduction line speed of the disc player based on the line speed detected by the above line speed detecting means. Where it exceeds the maximum reproduction line speed, control is performed so as to reduce the rotational speed of the rotation driving means so that the line speed at the read position after the change falls within the maximum reproduction line speed.

Then, after the line speed at the read position after the change falls within the maximum reproduction line speed, the read position is changed.

By this, when the change of the read position is completed, the reproduction enable state is reached at the read position, so it becomes unnecessary to wait until the line speed at which reproduction is possible is obtained. This means that the seek time of the reading means is shortened.

BRIEF DESCRIPTION OF THE DRAWINGS

The above and other objects and features of the present invention will be described more in detail with reference to the accompanying the drawings, in which.

DESCRIPTION OF THE PREFERRED EMBODIMENTS

Figure 1:
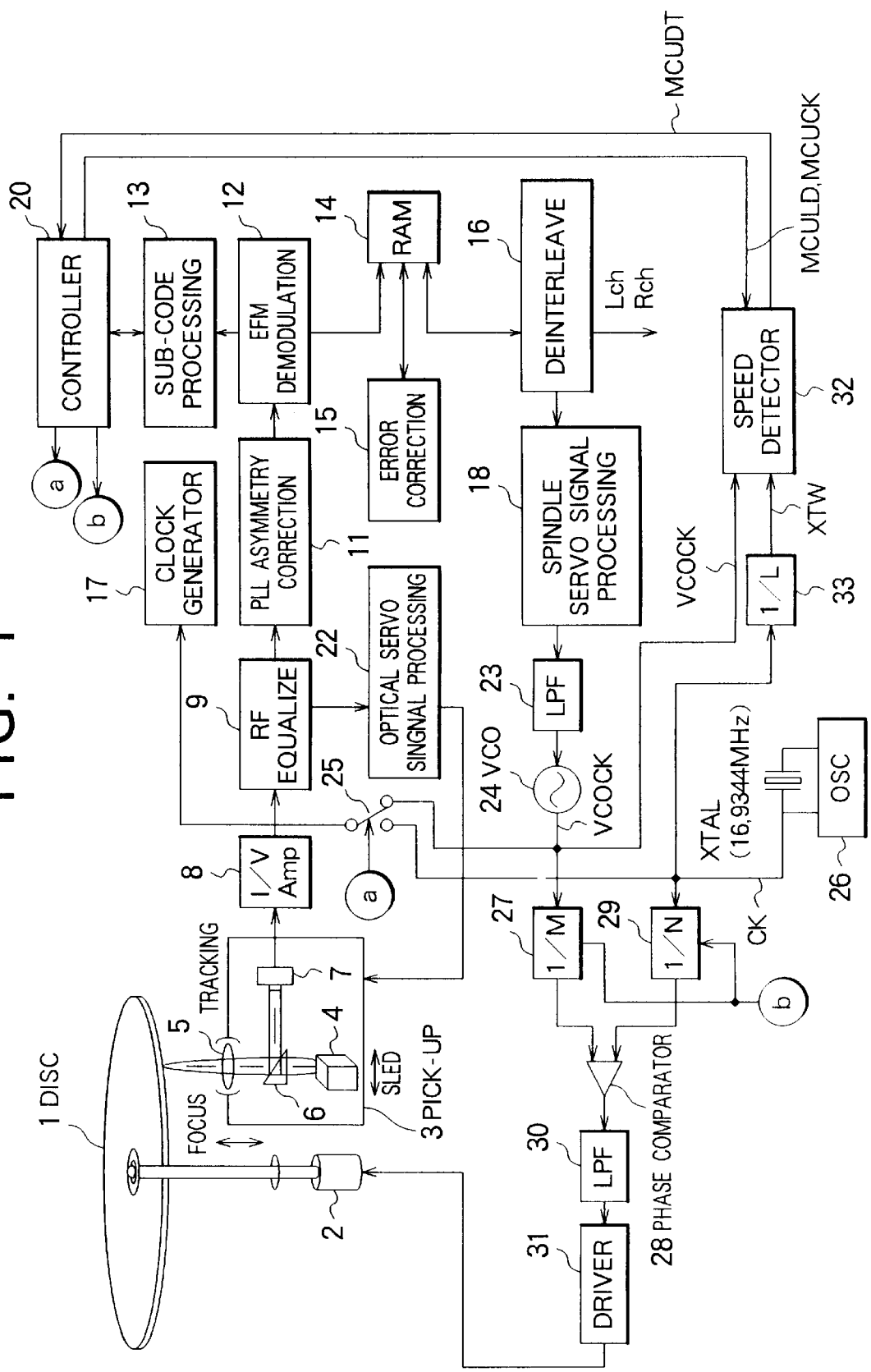
FIG. 1 is an explanatory view of an embodiment of a disc player according to the present invention.

A detailed explanation will be made of embodiments of the disc player according to the present invention by referring to the drawings.

FIG. 1 is a view of the configuration of the first embodiment of a disc player according to the present invention.

In FIG. 1, a disc 1 such as a CD or CD-ROM is rotated by a spindle motor 2 and the recorded information thereof is read by an optical pick-up (hereinafter simply referred to as a pick-up) 3. The pick-up 3 is constituted by a laser diode 4, an object lens 5 which converges the laser beam emitted from this laser diode 4 onto the signal recording surface of the disc 1 as the information reading beam spot, a polarized beam splitter 6 for changing the advance direction of the reflected light beam from the disc 1, a photodetector 7 which receives this reflected beam, etc. The pick-up 3 can freely move in the radial direction of the disc by using a sled feed motor (not illustrated) as the driving source.

In the pick-up 3, although not illustrated, there are further housed a tracking actuator, which moves the information reading beam spot in the radial direction of the disc with respect to the recording tracks of the disc 1, and a focus actuator, which moves the beam spot in the direction of the light axis of the object lens 5. The output signal of this pick-up 3 is converted from a current signal to a voltage signal at an I (current)/V (voltage) amplifier 8 and further waveform-shaped at an RF equalizing circuit 9 and then supplied to a phase locked loop (PLL) asymmetry correction circuit 11 and an optical servo signal processing circuit 22.

In the PLL asymmetry correction circuit 11, the correction of asymmetry is carried out, a binary EFM signal is obtained and, at the same time, continuous clock pulses are generated by the PLL structure based on the edge of this binary signal.

Here, asymmetry means a state where the center of the eye pattern of the RF signal deviates from the center of the amplitude.

On the other hand, the optical servo signal processing circuit 22 is a circuit for controlling the servo systems in relation to the operation of the pick-up 3, that is, a tracking servo system for making the information reading beam spot follow the recording track of the disc 1, a focus servo system for making the beam spot constantly converge onto the signal surface of the disc 1, and a sled servo system for performing the positional control in the disc radial direction of the pick-up 3. It has a structure in which a tracking error signal detected by a well known detection method, such as a three beam method, is supplied to a tracking actuator, a focus error signal detected by a well known detection method, such as the astigmatism method, is supplied to a focus actuator, and an error signal obtained by integrating, for example, a tracking error signal is supplied to a sled feed motor.

Next, the EFM signal from the PLL asymmetry correction circuit 11 is demodulated at an EFM demodulation circuit 12 and becomes the demodulated data and the parity for error correction and detection. At the same time, the sub-code just behind the frame synchronization signal is demodulated. This sub-code is supplied to the controller 20 through the sub-code processing circuit 13. The controller 20 contains a CPU. The data after the EFM demodulation is stored once in a RAM 14, then is corrected for error based on the error correction and detection parity by an error correction circuit 15. The data after the error correction is deinterleaved from the CIRC (Cross Interleave Reed-Solomon Code) at a deinterleave circuit 16 and is output as CD-ROM data (at the time of CD-ROM reproduction) and/or as audio data of L/Rch at the time of CD reproduction.

Here, the spindle servo signal processing circuit 18 is a circuit which detects the difference of the rotational speed of the spindle motor 2 (hereinafter simply referred to as the spindle rotational speed) with respect to the target rotational speed based on the reproduction frame synchronization signal from the disc 1 among the signals output from the deinterleave circuit 16 and outputs a servo error signal in accordance with this speed difference.

Then, the servo error signal from the spindle servo signal processing circuit 18 is supplied via an LPF (low pass filter) 23 to a VCO (voltage controlled oscillator) 24 as the control signal thereof. The oscillated output VCOCK of this VCO 24 becomes one input of a change-over switch 25.

The change-over switch 25 receives as its other input a fixed clock of for example 16.9344 MHz (44.1 kHz×384) generated by a crystal oscillator 26 and is controlled by the controller 20a to select either the oscillated output VCOCK of the VCO 24 or the fixed clock of 16.9344 MHz and supply the same to a clock generator 17.

The clock generator 17 generates a system clock of a fixed frequency when the fixed clock of the crystal oscillator 26 is supplied and generates a system clock of a variable frequency corresponding with the oscillated output VCOCK of the VCO 24 when the oscillated output VCOCK of the VCO 24 is supplied. Further, the oscillated output VCOCK of the VCO 24 is divided to 1/M by a 1/M frequency divider 24 and becomes one input of a phase comparator 28. Further, the fixed clock of the crystal oscillator 26 is divided to 1/N by a 1/N frequency divider 29 and becomes the other input of the phase comparator 28, serving as the reference clock. Note that the frequency division value M and N are variables which can be made any value and are set to appropriate values by the controller 20.

The phase comparator 28 detects the phase difference between the frequency-divided output of the 1/M frequency divider 27 and the frequency-divided output of the 1/N frequency divider 29 and outputs a phase difference signal in accordance with this phase difference.

This phase difference signal is supplied to a spindle driver 31 as the drive signal of the spindle 2 via the LPF (low pass filter) 30.

In the above structure, when the change-over switch 25 selects the fixed clock of the crystal oscillator 26, the system clock becomes fixed to 16.9344 MHz.

On the other hand, when the change-over switch 25 selects the oscillated output VCOCK of the VCO 24, this means that the system clock changes so that the servo error signal output from the spindle servo signal processing circuit 18 becomes zero. Namely, even if the rotational speed of the disc 1 is relatively loose, the system clock will change following the rotational speed thereof.

Further, the oscillated output VCOCK of the VCO 24 is supplied to the speed detector 32.

The speed detector 32 detects the line speed based on the output signal VCOCK since the line speed of the disc 1 is determined according to the oscillation frequency of the output signal VCOCK of the VCO 24 where the phases are synchronized (phase locked).

Further, the speed detector 32 receives, in addition to the oscillated output VCOCK, a signal XTW obtained by dividing the frequency of the output clock XTAL of the crystal oscillator 26 to 1/L. On the other hand, when reading the line speed detected by the speed detector 32, the controller 20 outputs a signal MCULD and a signal MCUCK to the speed detector 32. A line speed data MCUDT is generated based on these signals MCULD, MCUCK, XTW, and VCOCK and output to the controller 20.

Figure 2:
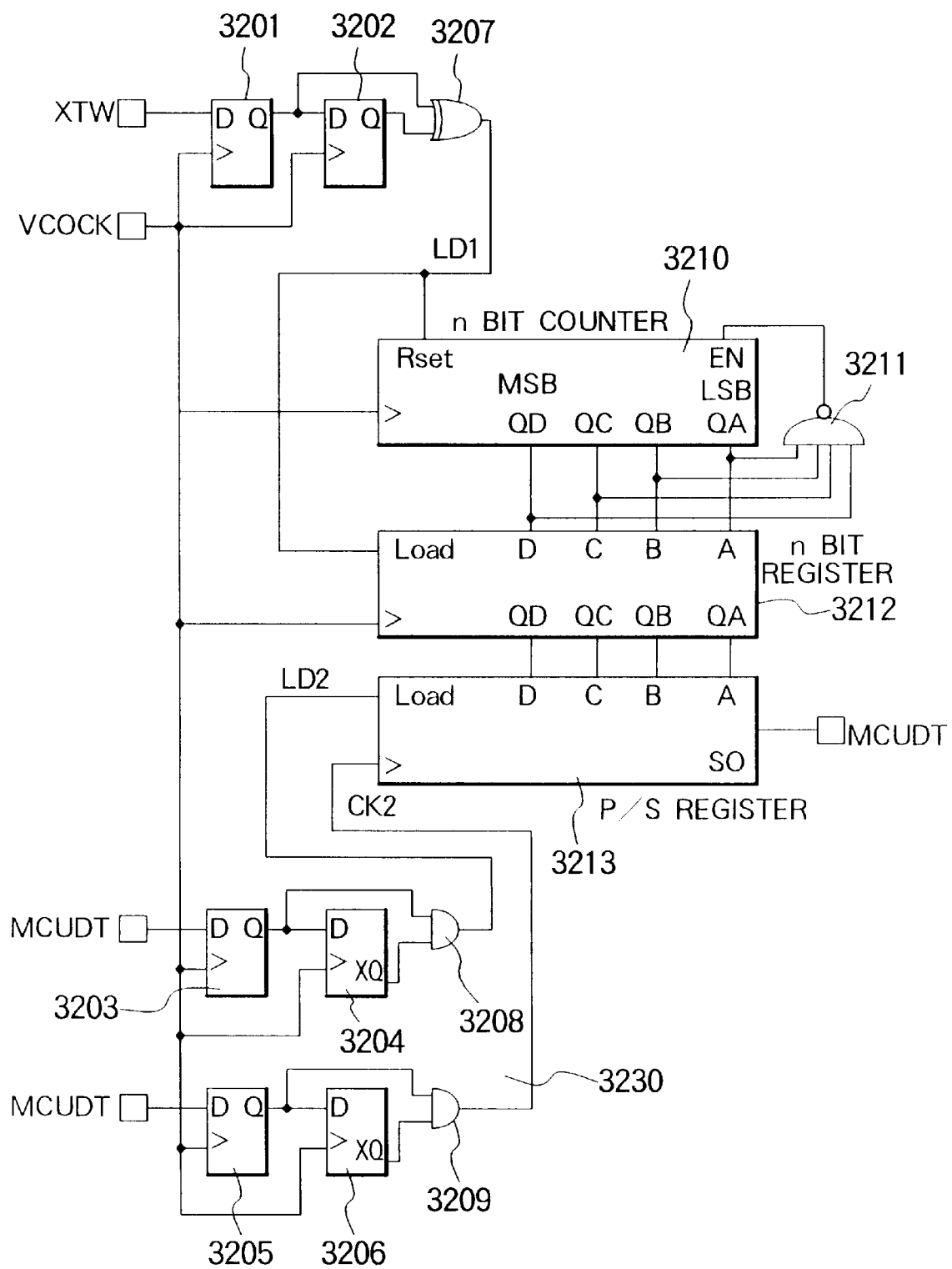
FIG. 2 is an explanatory view of an example of the configuration of a speed detector.

Here, FIG. 2 is a block diagram of an example of a circuit constituting the speed detector 32 for finding the line speed of the disc 1; and FIGS. 3A to 3K are timing charts of the speed detector 32 of FIG. 2.

The speed detector 32 has, as shown in FIG. 2, flip-flops 3201 to 3206, an exclusive logical OR gate 3207, AND gates 3208 and 3209, an n bit counter 3210, an n bit register 3212, a NAND gate 3211, and a P/S register 3213.

Here, where the settings of the frequency dividers 27 and 29 are made so that 1/M=1/N=1 and the oscillation frequency of the output clock XTAL of the crystal oscillator 26 is set to 16.9344 MHz, when the spindle 2 performs one speed reproduction, the oscillation frequency of the VCO 24 becomes 16.9344 MHz, the same as that of the output clock XTAL of the crystal oscillator 26. Further, when two speed reproduction is carried out by setting M=2 and N=1, the spindle rotates at twice the speed and the oscillation frequency of the VCO 24 becomes double, i.e., 33.8688 MHz. Namely, the line speed can be found if it is known what multiple of the output clock XTAL of the crystal oscillator 26 the oscillation frequency of the VCO 24 has become.

Figure 3:
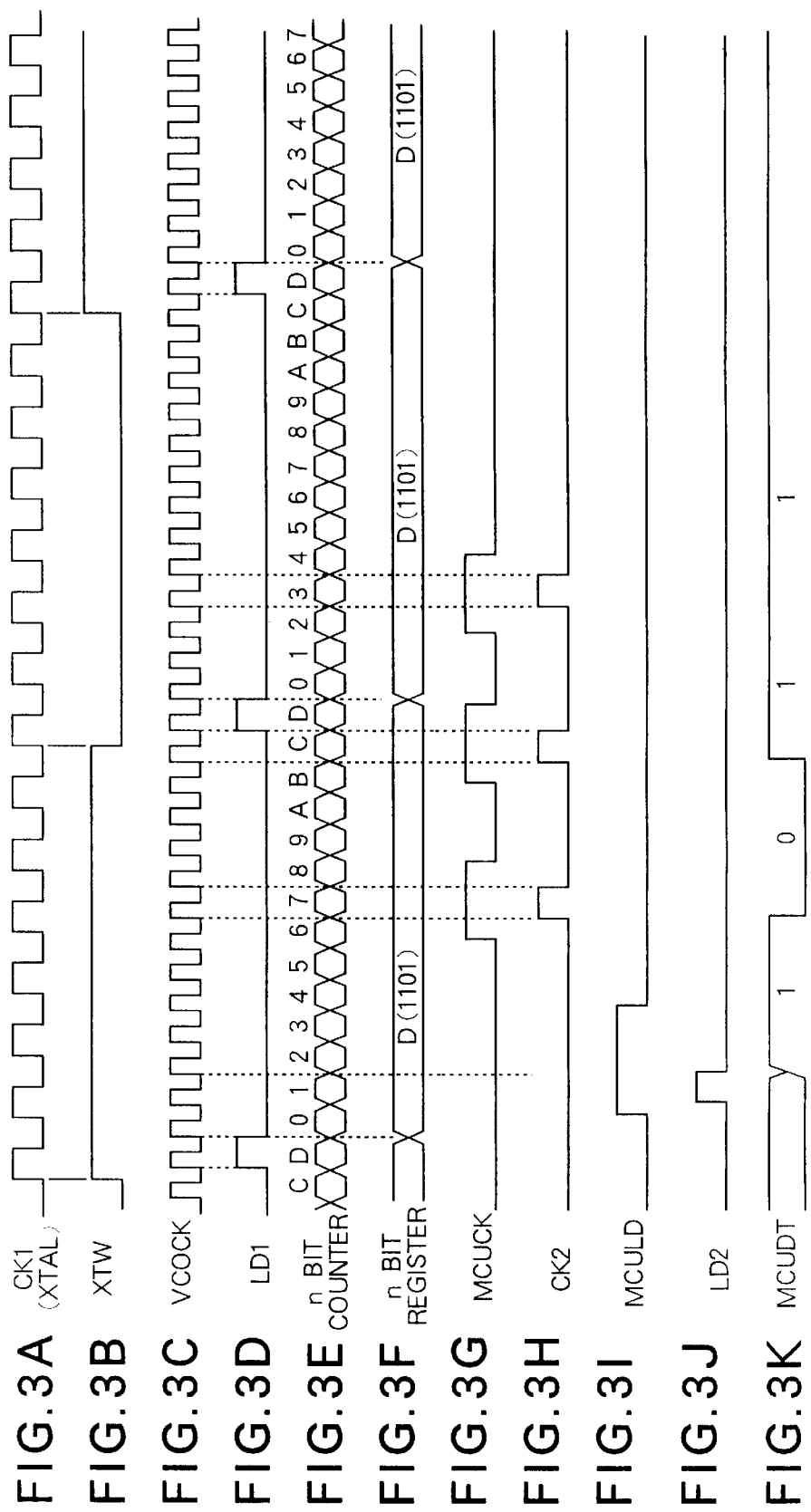
FIGS. 3A to 3K are timing charts of a speed detector shown in FIG. 2.

The circuit of FIG. 2 counts the oscillation frequency of the VCO 24 according to this principle. The input signal XTW shown in FIG. 3B is a signal obtained by dividing the frequency of the clock CK1 of the XTAL system shown in FIG. 3A to 1/L. In the example shown in the timing chart of FIG. 3A to FIG. 3C, L is set to be equal to 14.

The period from the point of change of this signal XTW to the next point of change becomes the period for counting the frequency.

That is, the section of the LD1 signal is counted by the oscillation frequency VCOCK of the VCO. In the timing chart of FIG. 3A to FIG. 3F, 14 VCOCK, are contained in this section. It is seen from this that the spindle rotates at double speed. This count is loaded in the n bit register 3212 at the timing of LD1 of FIG. 3D and the count is ended.

The means for reading the result of the count is the FF circuit 3230 for loading the data of the P/S register 3213 in the controller 20.

At the time of a read operation, the MCULD signal shown in FIG. 3I is input from the controller 20. By this, the LD2 signal shown in FIG. 3J is generated and the data is loaded in the P/S register 3213. Next, an MCUCK signal shown in FIG. 3G is input from the controller 20 for shifting out the data loaded from this P/S register 3213 to the MCUDT terminal. By this, a clock signal C shown in FIG. 3H is generated and input to the P/S register 3213. As a result, the line seed data MCUDT will be output to the controller 20 from the MCUDT terminal.

Next, an explanation will be made of the processing procedure of the controller 20 at the time of traverse of the pick-up 3 in the disc player constituted as described above referring to the flowchart shown in FIG. 4.

Figure 4:
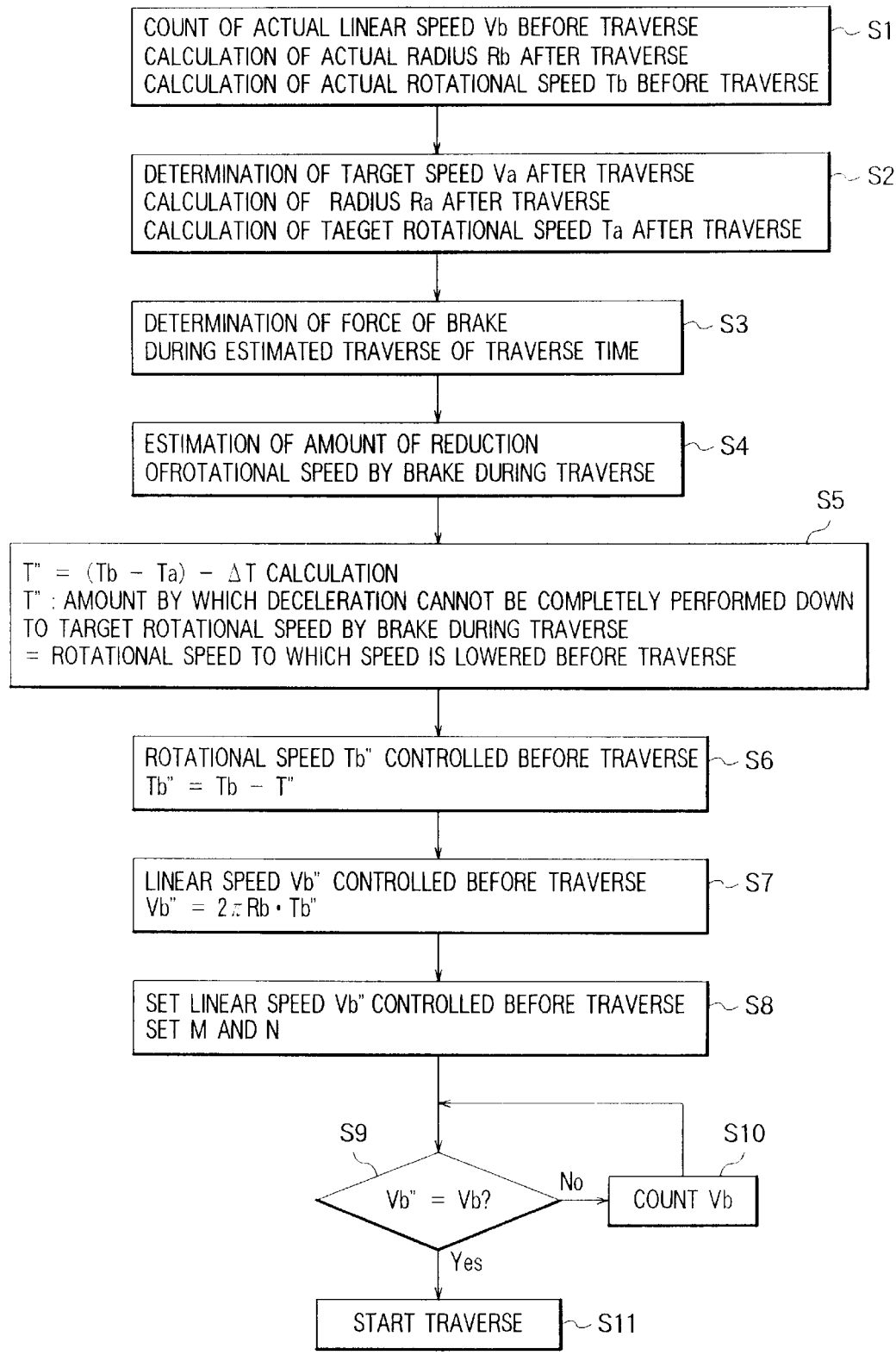
FIG. 4 is a flowchart showing a processing procedure in a controller of a disc player shown in FIG. 1.

STEP S1:

As shown in FIG. 4, in the controller 20, a line speed Rb before the traverse is obtained from the speed detector 32. The radius Rb and rotational speed Tb of the disc 1 are calculated from the sub-code at the position analyzed by the sub-code processing circuit 13.

STEP S2:

Next, a radius Ra at the target address is found from the value of the target address of the sub-code (absolute time after traverse), the line speed Va at the target address is determined within a range not exceeding the maximum reproduction line speed of the system, and the rotational speed Ta after the traverse is found from the line speed Va and the radius Ra.

Here, the maximum reproduction line speed is determined according to the characteristic of the optical system and RF amplifier, restrictions of the digital signal processing speed, etc.

Note that the reason why the line speed Va at the target address is selected to be within a range not over the maximum reproduction line speed of the disc player is to minimize the amount of deceleration at the traverse, thereby making the time required for deceleration as short as possible and thus shortening the seek time.

After the rotational speed Ta is found, the spindle motor 2 is controlled so that the rotational speed of the disc 1 is lowered to the rotational speed Ta before the traverse is ended and the line speed at the target address falls within the target line speed Va.

In the disc player shown in FIG. 1, of course, the reproduction data cannot be read during the traverse. For this reason, by utilizing the period during which the reproduction data cannot be read and making the amount of deceleration as large as possible and by performing a large amount of deceleration before the traverse is started, the seek time is shortened.

STEP S3:

Namely, the difference between the rotational speed Tb before the traverse and the rotational speed Ta after the traverse is the amount of the rotational speed which should be lowered. In this total amount of reduction of the rotational speed, the amount of reduction of the rotational speed T which can be performed during the traverse is estimated. To estimate this amount of reduction of the rotational speed T, the time required for the traverse is estimated and the brake force to be applied on the spindle motor 2 necessary during the traverse is determined.

The time required for the traverse can be determined approximately from the distance of movement before and after the traverse and the performance of the sled mechanism. Further, the brake force can be determined by, for example, the magnitude of the voltage applied in the brake mode of the driver 31.

Then, the time of application of the voltage in the brake mode of the driver 31 is set as the time required for the traverse, whereby the brake force to be applied to the spindle motor and the application time of the brake force are determined.

STEP S4:

As a result, the amount of reduction of the rotational speed T which can be performed during the traverse can be estimated.

STEP S5:

Next, the amount of reduction of the rotational speed T" necessary before the traverse is obtained by subtracting the amount of reduction of the rotational speed T which can be performed during the traverse from the amount of reduction of the rotational speed (Tb−Ta) necessary before and after the traverse.

STEP S6:

Then, by subtracting the amount of reduction of the rotational speed T" necessary before the traverse from the actual rotational speed Tb before the traverse, the rotational speed Tb", which should be controlled to before the traverse, is found.

STEP S7:

A corresponding line speed Vb" is found from the rotational speed Tb", which should be controlled to before the traverse.

STEP S8:

Then, the frequency division values M and N of the 1/M frequency divider 27 and the 1/N frequency divider 29 are set so that this line speed Vb" is obtained.

STEPS S9 and S10:

The controller 20 repeats the count until the actual reproduction line speed Vb becomes this set line speed Vb".

STEP S11:

When the actual reproduction line speed Vb becomes this set line speed Vb", the traverse is started.

By performing the above process, when the pick-up 3 is traversed and moved to the read position of the next data, the data can already be read out, so it becomes unnecessary to wait for the time for the rotational speed of the disc 1 to fall and it becomes possible to shorten the seek time.

Figure 5:
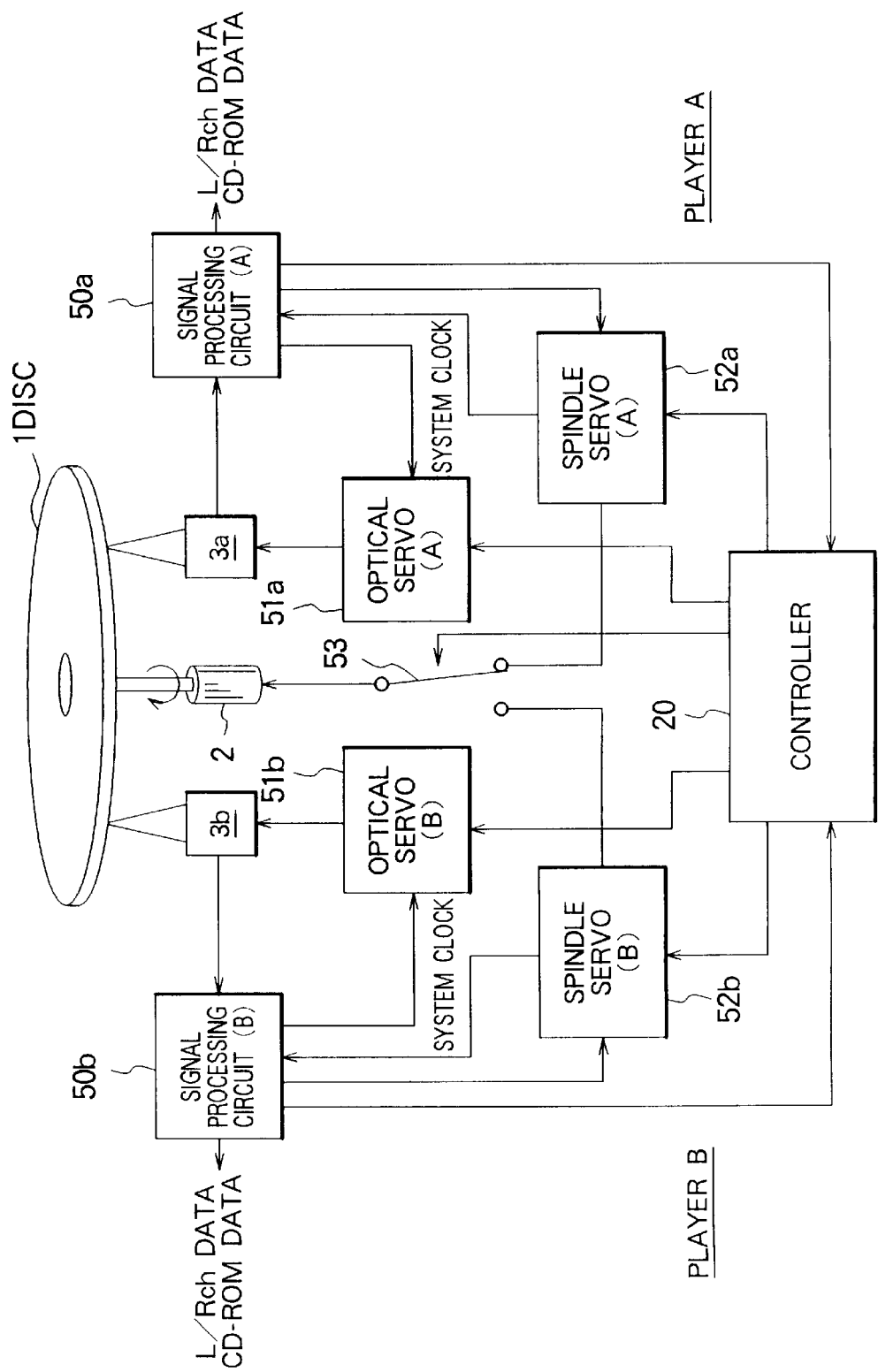
FIG. 5 is an explanatory view of another embodiment of the disc player according to the present invention.

Next, FIG. 5 is a view of the configuration of the second embodiment of the disc player according to the present invention.

The disc player shown in FIG. 5 is provided with two pick-ups 3*a* and 3*b*. Two players A and B serve as the two pick-ups 3*a* and 3*b*.

Namely, the two pick-ups 3*a* and 3*b* are provided with signal processing circuits 50*a* and 50*b* to perform various signal processing such as waveform shaping, demodulation, and error correction, optical servo circuits 51*a* and 51*b* are servo systems for the pick-ups 3*a* and 3*b*, and spindle servo circuits 52*a* and 52*b* control the rotation of the spindle motor 2. The players A and B are respectively constituted by these circuits.

Note that the output signals of the spindle servo circuits 52*a* and 52*b* are selectively supplied to the spindle motor 2 as the drive signals thereof by the change-over switch 53. Further, the entire system including the switching control of this change-over switch 53 is controlled by the controller 20 constituted by a CPU.

Since the disc player having the above configuration is provided with two pick-ups 3*a* and 3*b*, when the data is read by one pick-up 3*a* (3*b*), it becomes possible to move the other pick-up 3*b* (3*a*) to the position of data to be read next in advance and make it wait there. Further, the rotation of the spindle motor 2 is controlled based on the output signal of the spindle servo circuit 52*a* or 52*b* on the pick-up side reading the data.

The circuits constituting the player A and the player B are exactly the same.

Further, the configurations of the signal processing system and control system of the players A and B are similar to the configurations of the signal processing system and control system shown in FIG. 1, respectively.

The operation in this disc player where the pick-up 3*a* side is defined as the player A, the pick-up 3*b* side is defined as the player B, and the change-over switch 52 is switched to the player A side will be explained.

In FIG. 5, when the frequency division values of the frequency dividers 27 and 29 of the player A are set so that 1/M=1/N stands, the rotational speed of this disc 1 is controlled by the player A to the normal speed as a target.

Although the spindle motor 2 is controlled to the normal rotational speed as a target, the actual rotational speed does not always completely coincide with the target value depending on the characteristic of the spindle servo loop. The speed difference thereof is given by the spindle servo signal processing circuit 18 to the VCO 24 through the LPF 23. The oscillation frequency VCOCX of the VCO 24 changes to cancel the speed difference, whereby the system is stabilized.

That is the signal processing circuit 50*a* follows the rotational speed of the disc 1. The exact same situation occurs on the player B side. Although the rotational speed of the disc 1 is controlled by the player A, the signal processing circuit 50*b* follows this spindle rotational speed and can simultaneously read the data.

Figure 6:
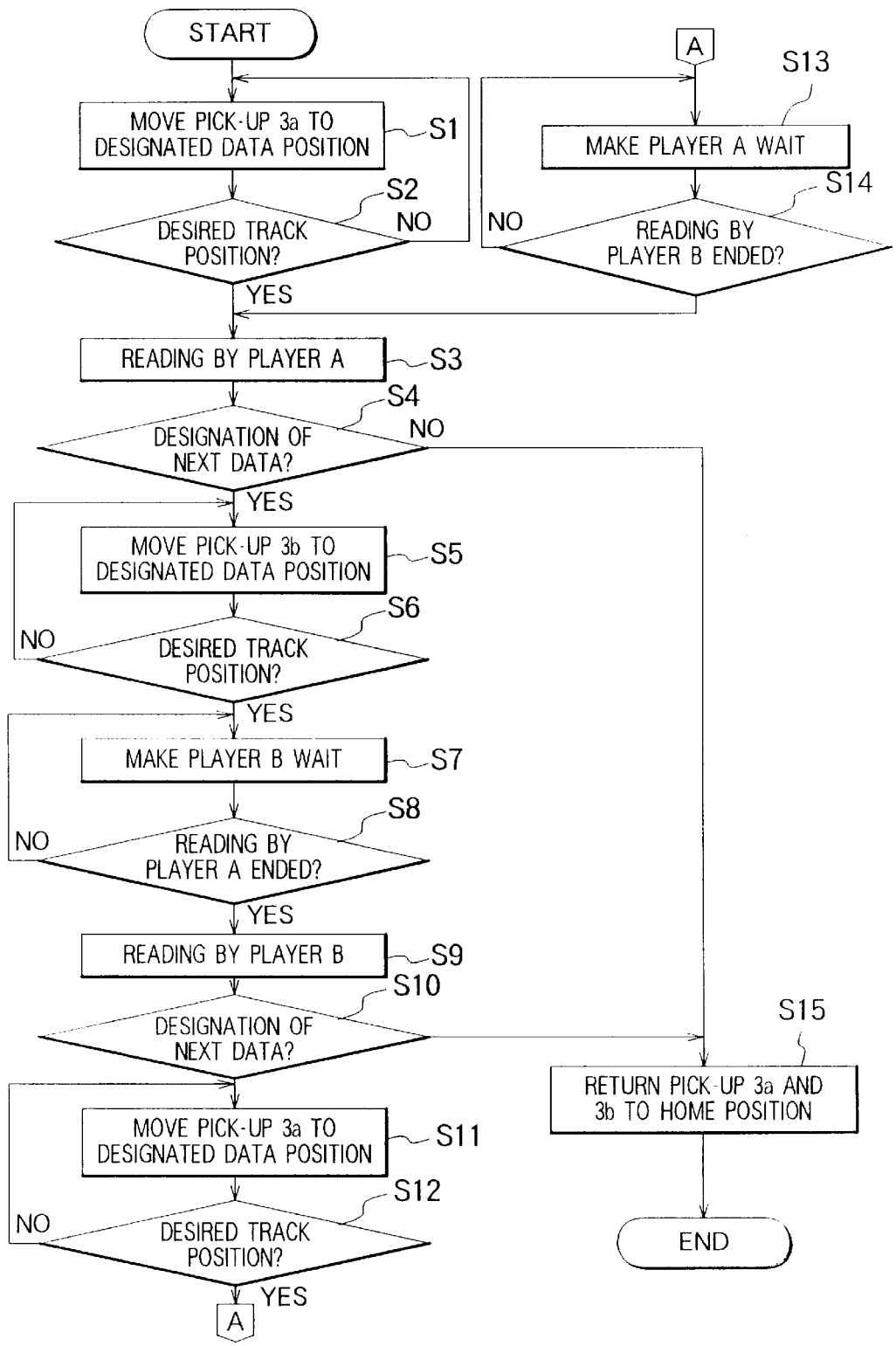
FIG. 6 is a flowchart showing the procedure of the reproduction processing.

Here, how the two players A and B are actually utilized will be explained with reference to the processing procedure thereof according to the flowchart of FIG. 6 by using a concrete example. Note that, in the present embodiment, it is assumed that the reading of data is started from the player A side.

STEP S1:

The system controller 8 first moves the pick-up 3*a* of the player A to the track position of the data first specified for reading.

STEPS S2 and S3:

When the pick-up 3*a* reaches the desired track position (STEP S2), the reading of the data by the player A is started (STEP S3).

While the data is being read by this player A, the change-over switch 53 of FIG. 5 is set to the player A side.

STEP S4:

It is decided whether or not the data to be read next has been designated during the reading of data by the player A.

STEP S5:

Where it has been designated, the pick-up 3*b* of the player B is moved to the track position of the data to be read next.

STEPS S6 and S7:

When the pick-up 3*b* reaches the desired track position (step S6), it is made to wait at that position (STEP S7).

STEPS S8 and S9:

Then, when the reading of data by the player A is ended (STEP S8), the reading of the data by the player B, which has waited heretofore, is started (STEP S9).

STEPS S11 to S13:

During the reading of data by this player B, the change-over switch 53 of FIG. 5 is set to the player B side. It is decided whether or not the data to be read next has been designated during the reading of data by the player B (STEP S10). If it has been designated, the pick-up 3*a* of the player A is moved to the track position of the data to be read next (STEP S11). When the pick-up 3*a* reaches the desired track position (STEP S12), it is made to wait at that position (STEP S13).

STEPS S14 and S15:

Then, when the reading of data by the player B is ended (STEP S14), the processing routine returns to STEP S3, where the above series of steps is repeated. Note that, if at STEP S4 or S10 the data to be read next has not been designated, the pick-up 3*a* and 3*b* are returned to the home position (STEP S15) and the series of processing is ended.

By adopting a configuration in which two pick-ups 3*a* and 3*b* are provided and, at the same time, the signal processing circuits 50*a* and 50*b* are made to follow the rotational speed of the disc 1 by the mode of operation of the spindle servo circuits 52*a* and 52*b*, respectively corresponding to the pick-ups 3*a* and 3*b*, simultaneous reading of data at the players A and B becomes possible.

Accordingly, during a period where the data is read by one player A or B, the other player B or A is moved to the track position of the data to be read next in advance and made to wait there, whereby the seek time can be brought to almost zero. Therefore the seek time can be greatly shortened and a high speed seek operation can be realized.

Further, when the read operation of the previous data is ended, the operational routine can be immediately shifted to the read operation of the next data subsequent to this, therefore the average access time required from the end of reading of one set of data to the start of reading of a set of data recorded at another position can be greatly shortened in comparison with the conventional time.

In a disc player having such a configuration, when the radius of the read position of the pick-up 3a wand line speed are defined as Ra and Va, the radius of the position of the pick-up 3b and line speed are defined as Rb and Vb, and the rotational speed of the disc 1 is defined as n (times/sec), the line speed Va becomes Ra/Rb times the line speed Vb.

On the other hand, the radius ratio Ra/Rb becomes the maximum where one of the pick-up 3a and 3b is located on the innermost circumference of the disc 1 and the other is located on the outermost circumference and becomes a standard 2.52 times.

For example, where the reproduction is carried out by the pick-up at the outermost circumference after 8 speed reproduction is carried out by the pick-up at the innermost circumference, the reproduction speed corresponds to 20.16 speed at the instant of movement. Namely, there is generally a margin of safety in the reproduction speed of several tens of percent. The above reproduction speed largely exceeds the permissible range. Therefore, no data can be read until the line speed of the pick-up waiting at the outermost circumference is lowered to a speed at which reproduction is possible, which leads a considerable elongation of the seek time.

Figure 7:
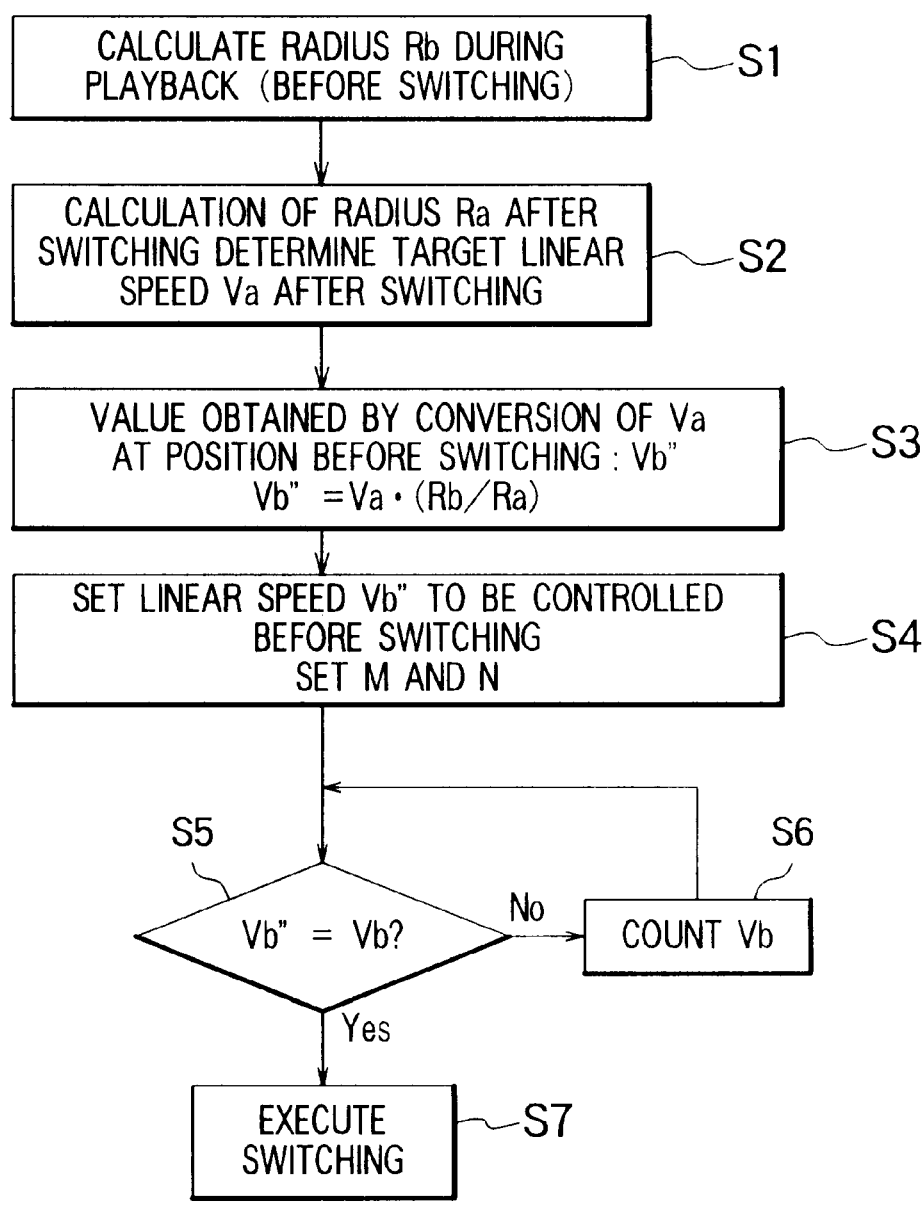
FIG. 7 is a flowchart showing a processing procedure in a controller of the disc player shown in FIG. 4.

Therefore, to prevent such an elongation of the seek time, in the controller 20, the processing shown in the flowchart of FIG. 7 is carried out.

STEP S1:

In FIG. 7, the radius Rb at the position B of the pick-up now performing the reproduction is found. This radius Rb can be found from the absolute time in the sub-code of the track which is now being reproduced.

STEP S2:

Then, from this state, the radius Ra at the position A of the pick-up to be switched to next is similarly calculated from the target address (value of sub-code). The target line speed Va is determined to be within a range where the reproduction line speed does not exceed the maximum reproduction line speed Vmax at the switching position A based on the calculated radius Ra.

STEP S3:

Next, the value Vb" is obtained by converting the above target line speed Va to the line speed at the position B before the switching.

STEP S4:

Further, the M of the 1/M frequency divider 27 and N of the 1/N frequency divider in FIG. 1 are set so as to obtain this converted line speed Vb". When deceleration must be carried out, the deceleration is performed by applying a brake.

STEPS S5 to S7:

After M and N are set, the controller 20 decides if the actual reproduction line speed Vb at the current position B has become the converted line speed Vb" by acquiring the reproduction line speed Vb from the speed detector 32 (STEP S5), repeats the count until it becomes the line speed Vb" (STEP S6), and, when the reproduction line speed Vb becomes the line speed Vb", switches the pick-up for the reproduction (STEP S7).

As described above, before the pick-up for reproduction is switched, the line speed is detected based on the read information of the pick-up which is now engaged in reproduction. The rotational speed of the spindle motor 2 is controlled so that the line speed at the position B after the pick-up switching falls within the maximum reproduction line speed based on this line speed information. By this, when the pick-up for reproduction is switched, the line speed at the position B has already fallen within the maximum reproduction line speed. For this reason, it becomes possible to immediately start the read operation and there is no unnecessary waiting time, so the seek time can be greatly shortened.

In the above description, as one of embodiments of the disc reproduction apparatus according to the present invention, the CD-ROM player was described, but, the present invention can be applied to a variety of disc reproduction apparatuses. For example, in FIG. 1, the CD-ROM 1 can be a disc recording medium storing data, and the EFM demodulation circuit 12 can be a suitable demodulation circuit for demodulating data stored in the disc, and the controller 20 can be a suitable controller for controlling such disc reproducing apparatus.

What is claimed is:

1. A disc reproducing apparatus comprising:

a rotation driving means for rotating a disc;

a plurality of reading means for reproducing recorded information from the disc;

a plurality of rotation servo means for detecting a speed difference between a rotational speed of said disc detected from the read signal of said reading means and a target rotational speed, generating a clock having a frequency in response to the speed difference, detecting the phase difference between the clock and a reference clock, and outputting a command signal in response to the phase difference to said rotation driving means to control the rotational speed of the rotation driving means;

a switching means for selecting one of said plurality of reading means;

a selecting and supplying means for selecting one signal among the command signals from said plurality of rotating servo means corresponding to the selected reading means and supplying the selected command signal to said rotation driving means;

a line speed detecting means for detecting the line speed at the read position of said disc based on the read signal of said plurality of reading means; and a control means for controlling the rotational speed of said rotation driving means before switching a read switch so that the line speed at the read position of the other of said plurality of reading means falls within a maximum reproduction line speed based on the line speed obtained from said line speed detecting means corresponding to one of said plurality of reading means when switching from one reading means to another reading means.

2. The disc reproducing apparatus as set forth in claim 1, wherein:

said reading means includes first and second reading means;

said control means further including means for finding the radius of the read position of the first reading means which is reproducing the data of a disc based on the read signal, determining the target line speed at the read position of the second reading means, said target line speed being defined within a range of the maximum reproduction line speed, converting the target line speed into the line speed at the read position of the first reading means, and switching the reproducing read means from one reading means to the other reading means after controlling the rotational speed of the disc so as to rotate at the converted line speed.

3. The disc reproducing apparatus as set forth in claim 1 wherein:

said rotation servo means has a first frequency dividing means for dividing the frequency of the clock having a frequency in response to the speed difference between the rotational speed of said disc detected from the read signal of said reading means and the target rotational speed by a variable frequency division ratio, a second frequency dividing means for dividing the frequency of said reference clock by the variable frequency division ratio, and a phase comparing means for detecting the phase difference of the frequency-divided outputs of said first and second frequency dividing means; and said control means performs the control of the rotational speed of said disc by changing the frequency division ratio of said first and second frequency dividing means in response to the line speed obtained from said line speed detecting means.

4. The disc reproducing apparatus as set forth in claim 3, wherein:

said reading means includes an optical pick-up which is freely movable in the radial direction; and said rotation servo means has a modulation circuit for modulating the read signal of said optical pick-up, outputting the modulated signal, a demodulation circuit for demodulating the modulated signal, outputting the demodulated signal, a servo signal processing circuit for detecting a speed difference between a rotational speed of said rotation driving means detected from a reproduction frame synchronization signal of said demodulated signal and the target rotational speed, outputting the servo error signal in response to the speed difference, a clock generating circuit for generating a clock having a frequency in response to the servo error signal from said servo signal processing circuit, a first frequency dividing circuit for dividing the frequency of the clock which is outputted from said clock generating circuit, a second frequency diving circuit for dividing the frequency of a reference clock, and a phase comparing circuit for detecting the phase difference of the frequency-divided outputs of said first and second frequency dividing circuits.

5. The disc reproducing apparatus as set forth in claim 4, wherein:

said modulation circuit performs the eight to fourteen modulation.

6. The disc reproducing apparatus as set forth in claim 1, wherein said line speed detecting means further includes:

means for counting the number of clock pulses in the clock signal having a frequency corresponding to the speed difference between the rotational speed of said disc detected from the read signal of said reading means and the target rotational speed for a predetermined period whereby the line speed is detected from this number of clocks.

7. The disc reproducing apparatus as set forth in claim 6, wherein said line speed detecting means includes:

a counter circuit for counting the number of clock pulses in the clock signal having a frequency in response to the speed difference between the rotational speed of said disc detected from the read signal of said reading means and the target rotational speed for a predetermined period, a load circuit for reading out the number of clocks of said counter circuit, loading the number of clocks, an output circuit for reading out the number of clocks of said load circuit, converting the number of clocks to a serial data, outputting the data to said control means.

* * * * *

UNITED STATES PATENT AND TRADEMARK OFFICE
CERTIFICATE OF CORRECTION

PATENT NO. : 5,910,934
DATED : June 8, 1999
INVENTOR(S) : Kazutoshi SHIMIZUME

It is certified that error appears in the above-identified patent and that said Letters Patent is hereby corrected as shown below:

Claim 4, line 20, Column 14, line 3, "frequency diving" should read -- frequency dividing --.

Signed and Sealed this

Eleventh Day of April, 2000

Attest:

Q. TODD DICKINSON

Attesting Officer

Director of Patents and Trademarks